(12) United States Patent
Yoon

(10) Patent No.: US 8,465,868 B2
(45) Date of Patent: Jun. 18, 2013

(54) BATTERY PACK AND FABRICATING METHOD THEREOF

(75) Inventor: Heuisang Yoon, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1192 days.

(21) Appl. No.: 11/984,530

(22) Filed: Nov. 19, 2007

(65) Prior Publication Data

US 2008/0118825 A1    May 22, 2008

(30) Foreign Application Priority Data

Nov. 20, 2006 (KR) .......................... 10-2006-0114423

(51) Int. Cl.
*H01M 2/00* (2006.01)
*H01M 2/08* (2006.01)

(52) U.S. Cl.
USPC .......................................... 429/163; 429/175

(58) Field of Classification Search
USPC ............................. 429/61, 163–164, 174–175
See application file for complete search history.

(56) References Cited

U.S. PATENT DOCUMENTS

| | | | | | |
|---|---|---|---|---|---|
| 4,331,744 | A | * | 5/1982 | Henk et al. ........................ | 429/59 |
| 5,999,410 | A | | 12/1999 | Weiler | |
| 7,807,285 | B1 | * | 10/2010 | Berg et al. ........................ | 429/97 |
| 2003/0082441 | A1 | * | 5/2003 | Hovi et al. ...................... | 429/123 |
| 2004/0251872 | A1 | | 12/2004 | Wang et al. | |
| 2006/0083982 | A1 | * | 4/2006 | Jung et al. ..................... | 429/164 |
| 2006/0099492 | A1 | | 5/2006 | Jeon | |
| 2006/0263685 | A1 | * | 11/2006 | Kwon .......................... | 429/185 |
| 2008/0233472 | A1 | * | 9/2008 | Ota et al. ....................... | 429/122 |

FOREIGN PATENT DOCUMENTS

| | | |
|---|---|---|
| EP | 1814189 A1 | 8/2007 |
| JP | 2003-197165 | 7/2003 |
| JP | 2003-308881 A | 10/2003 |

(Continued)

OTHER PUBLICATIONS

Japanese Office Action issued by Japanese Patent Office on Apr. 19, 2011 corresponding to Korean Patent Application No. 2006-0114423 and Request for Entry of the Accompanying Office Action attached herewith.

(Continued)

*Primary Examiner* — Patrick Ryan
*Assistant Examiner* — Muhammad Siddiquee
(74) *Attorney, Agent, or Firm* — Robert E. Bushnell, Esq.

(57) ABSTRACT

Disclosed are a battery pack and a fabricating method which can increase the coupling strength of a bare cell and a circuit accessory and prevent the circuit accessory from being separated from the bare cell due to external forces such as bending, twisting and falling of a battery, by forming a fixing member protruding from the upper part of the bare cell, and coupling the fixing member with a fixing member hole of the circuit accessory formed in advance by injection molding in the type of the fixing member being laid across the fixing member hole. The battery pack includes: a bare cell having a cap plate on the upper part of the bare cell; and a circuit accessory coupled with the upper part of the bare cell, wherein a fixing member is formed to protrude from the outer surface of the cap plate, a fixing member hole corresponding to the fixing member is formed on the circuit accessory, and the fixing member is inserted in and is coupled with the fixing member hole.

13 Claims, 13 Drawing Sheets

FOREIGN PATENT DOCUMENTS

| | | |
|---|---|---|
| JP | 2003308881 | 10/2003 |
| JP | 2005-197067 | 7/2005 |
| JP | 2005-279677 | 10/2005 |
| JP | 2006-004783 A | 1/2006 |
| JP | 2006-236879 | 9/2006 |
| KR | 1020050074197 | 7/2005 |
| KR | 2005-0097699 | 10/2005 |
| WO | 2006-046343 A | 5/2006 |

OTHER PUBLICATIONS

European Examination Report issued by European Patent Office on Sep. 17, 2009 corresponding to Korean Patent Application No. 2006-0114423.

Japanese Office Action issued on Oct. 2, 2012 in the corresponding Japanese Patent Application No. 2007-260068.

* cited by examiner

BATTERY PACK AND FABRICATING METHOD THEREOF

CLAIM OF PRIORITY

This application makes reference to, incorporates the same herein, and claims all benefits accruing under 35 U.S.C. §119 from an application earlier filed in the Korean Intellectual Property Office on 20 Nov. 2006 and there duly assigned Serial No. 10-2006-0114423.

BACKGROUND OF THE INVENTION

1. Field of the Invention

The present invention relates to a battery pack. More specifically, the present invention relates to a battery pack and a fabricating method thereof which can increase a coupling strength between a bare cell and a circuit accessory thus prevent the circuit accessory from being separated from the bare cell due to external forces like bending, twisting and falling of a battery, by forming a fixing member protruding from the upper part of the bare cell, and coupling the fixing member with a fixing member hole of the circuit accessory formed in advance by injection molding in the type of the fixing member being laid across the fixing member hole.

2. Description of the Related Art

Generally, a secondary battery is a battery capable of charging and discharging, differently from a primary battery which is not capable of charging. The secondary battery has been manufactured in the shape of a battery pack and broadly used as power supplies of portable electronic devices like a cellular phone, a notebook computer, a Personal Digital Assistant (PDA) and a camcorder.

Especially, a lithium secondary battery among the secondary batteries has high operating voltage and energy density per unit weight, thus is more suitable for potable electronic devices.

The general battery pack of the lithium secondary battery includes a bare cell capable of charging and discharging, a protection circuit board electrically coupled with the bare cell, the protection circuit board controlling charging and discharging and intercepting a circuit at the time of over charge and over discharge, and a resin molding formed as an external case by a hot melting method of filling hot melt resin in a gap between the bare cell and the protection circuit board to prevent the protection circuit board from being separated from the bare cell, to capably mount the battery pack on an external electronic device. The battery pack includes a separate holder for supporting the resin molding portion to prevent the resin molding portion from being separated from the bare cell by the external forces like bending, twisting and falling tests applied between the bare cell and the protection circuit module.

A conventional battery pack completed by resin molding uses resin of high temperature and high pressure to fill the small gap between the bare cell and the protection circuit board, and the resin of high temperature and high pressure might break down various electronic components of the protection circuit board.

Also, in the conventional battery pack completed by resin molding, an external terminal installed in the protection circuit module and electrically coupling the bare cell with the external electronic device is formed to be pad type in a flat shape. When said an external terminal of the conventional battery pack is coupled with a connection part formed in the external electronic device with surface contact, if an external shock such as falling is given to the battery, the surface contact between the external terminal of the battery pack and the connection part of the external electronic device can be cut off by the external shock. Accordingly, the instability of the electrical connection between the battery pack and the external electronic device becomes a problem.

When the pad-type external terminal of the conventional battery pack is coupled with the connection part of the external electronic device with pushing contacts, when the number of the pushing increases, a coating layer on the surface of the external terminal might peel off or crack. When such cracking of the coating layer of an external terminal of the battery pack gets serious, the electrical flow between the battery pack and the external electronic device might become out of order. Also, because the pad-type external terminal of the battery pack is disposed in the form of being exposed directly to the outside of the batter pack, it might be corroded by moisture in the air as a long period of time elapses.

Accordingly, a connector-type external terminal that is not exposed directly to the outside of the battery pack and is not coupled with the external electronic device with pushing contacts is needed. However, because the connector type external terminal has a complicated shape and a plurality of openings, it is difficult to apply the resin molding method of filling resin between the protection circuit module and the bare cell during the manufacture when the battery pack having a connector type external terminal.

SUMMARY OF THE INVENTION

It is therefore an object of the present invention to provide improved battery pack and improved process for manufacturing packs.

It is another object to provide a battery pack and a fabricating method thereof capable of increasing the coupling strength between a bare cell and a circuit accessory thus preventing the circuit accessory from being separated from the bare cell due to external forces like bending, twisting and falling of a battery, by forming a fixing member protruding from the upper part of the bare cell, and coupling the fixing member with a fixing member hole of the circuit accessory that is formed in advance by injection molding in the type of the fixing member being laid across the fixing member hole.

Additional advantages, objects and features of the invention will be set forth in part in the description which follows and in part will become apparent to those having ordinary skill in the art upon examination of the following or may be learned from practice of the invention.

According to an aspect of the present invention, there is provided a battery pack, includes: a bare cell having a cap plate on the upper part thereof; and a circuit accessory coupled with the upper part of the bare cell, wherein a fixing member is formed to protrude from the outer surface of the cap plate, a fixing member hole corresponding to the fixing member is formed on the circuit accessory, and the fixing member is inserted in and is coupled with the fixing member hole.

The fixing member may be laid across and is coupled with the inner surface of the fixing member hole and the shape of the perpendicular section of the fixing member may be "T" shape.

The circuit accessory may be disposed on the upper part of the cap plate and is electrically coupled with the bare cell through a lead plate installed on the cap plate.

The circuit accessory may includes: a printed circuit board electrically coupled with the bare cell by the lead plate; an upper cover covering the printed circuit board, including the fixing member hole to couple with the bare cell by the fixing member; and an external terminal installed between the printed circuit board and the cover and electrically coupling the printed circuit board with an external electronic device.

The external terminal may be connector type.

The upper cover may include a principal plane having a shape and a size corresponding to those of the cap plate and a skirt bent and extended from the edge of the principal plane to the direction of the bare cell.

The fixing member hole may include an upper hole and a lower hole formed in a direction from the outer surface of the principal plane to the inside of the cover on a position perpendicularly corresponding to the fixing member, and the diameter of the upper hole is greater than the diameter of the lower hole to form a peripheral flange around stepped surface between the upper hole and the lower hole.

The fixing member may include a head portion being laid across the peripheral flange around stepped surface and a post portion disposed in the lower hole.

The battery pack of the present invention may further comprise a washer installed between the stepped surface and the head portion of the fixing member.

The outer diameter of the washer may be less than or equal to the diameter of the upper hole of the fixing member hole, and the inner diameter of the washer is greater than or equal to the diameter of the lower hole. The washer may be made of a stainless steel.

The diameter of the head portion may be greater than the diameter of the lower hole and is less than or equal to the diameter of the upper hole.

A concave recess whose perpendicular section has a polygonal shape may be formed on the upper surface of the head portion.

The fixing member may be formed integrally on the cap plate.

The cap plate may have a thickness twice to three times of that of the rest area in an area adjoining the area on which the fixing member is formed.

At least one weld hole may be formed on the skirt of the upper cover corresponding to electrical connection plates of the printed circuit board to weld the electrical connection plates formed on the printed circuit board to the lead plates of the bare cell.

The battery pack may further include a label such as a printed sheet adhered to the weld hole of the upper cover and adhered to enclose the side portion of the bare cell including the contact portion of the bare cell and the upper cover.

The lead plate of the bare cell may be inserted in a socket formed in the printed circuit board.

The battery pack of the present invention may include a stopper made of a material selected among rubber, glue and silicon may be installed to seal the fixing member hole.

According to another aspect of the present invention, a fabricating method is provided, which includes: preparing a bare cell on which a fixing member is installed; preparing a circuit accessory on which a fixing member hole corresponding to the fixing member is formed; inserting the fixing member in the fixing member hole, and physically coupling the circuit accessory with the bare cell by a spinning process or a punching process; and electrically coupling the bare cell with the circuit accessory.

The step of preparing a bare cell may include: forming a cap plate having the fixing members in the shape of protruding fixing members on outer surfaces of both side portions in a longitudinal direction of the cap plate on the upper part of the bare cell; and installing lead plates on the cap plate.

The fixing member may be formed by rolling the cap plate or is installed separately on the cap plate.

The protruding height of the fixing member protruded from the outer surface of the cap plate by a rolling process may be ½ to ⅔ of the thickness of the cap plate.

The step of preparing the circuit accessory may include: preparing a printed circuit board having electrical connection plates electrically coupled with the lead plates; preparing an upper cover covering the printed circuit board and including the fixing member hole; and installing an external terminal on the printed circuit board or the upper cover for electrical connection with the printed circuit board.

The step of preparing the upper cover may be to form by extruding a principal plane having a shape and a size corresponding to those of the cap plate and a skirt bent and extended from the edge of the principal plane to the direction of the bare cell; a fixing member hole disposed on the principal plane corresponding to the fixing member; and at least one weld hole on the skirt corresponding to the electrical connection plates of the printed circuit board.

The fixing member hole may include an upper hole and a lower hole formed in a direction from the outer surface of the principal plane to the inside of the upper cover on a position perpendicularly corresponding to the fixing member, and the diameter of the upper hole may be formed to be greater than the diameter of the lower hole to form a peripheral flange around stepped surface between the upper hole and the lower hole.

The height of the lower hole may be shorter than the protruding height of the fixing member to make the fixing member protrude above the stepped surface when the fixing member is inserted in the fixing member hole.

The step of inserting the fixing member in the fixing member hole, and coupling the circuit accessory and the bare cell may include: inserting the fixing members installed in the shape of protruding fixing members on both side portions in a longitudinal direction of the cap plate to protrude above the stepped surface of the fixing member hole of the upper cover; and forming the fixing member to be a head portion laid across the stepped surface and a fixing member portion disposed in the lower hole with the spinning or punching process. The step of coupling the circuit accessory and the bare cell may comprise inserting a washer on the fixing member before spinning or punching the fixing member.

The step of electrically coupling the bare cell and the circuit accessory may be welding the lead plates of the bare cell to the electrical connection plates of the printed circuit board through the weld hole of the upper cover.

The fabricating method of a battery pack of the present invention may further include: covering the fixing member hole with a stopper; and adhering a label to the side portion of the bare cell including the weld hole of the upper cover and the contact portion of the upper cover and the bare cell.

The step of preparing a circuit accessory may include: preparing a printed circuit board having a socket coupled with the lead plate; preparing an upper cover covering the printed circuit board and including the fixing member hole; and installing an external terminal between the printed circuit board and the cover.

The step of electrically coupling the bare cell and the circuit accessory may be inserting the lead plates of the bare cell in the sockets of the printed circuit board.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein:

FIG. 9b is a cross-sectional diagram illustrating the fixing member of FIG. 9a;

FIG. 11b is a cross-sectional diagram illustrating the fixing member of FIG. 11a;

FIG. 12b is a cross-sectional diagram illustrating the fixing member of FIG. 12a.

DETAILED DESCRIPTION OF THE INVENTION

Figure 1:
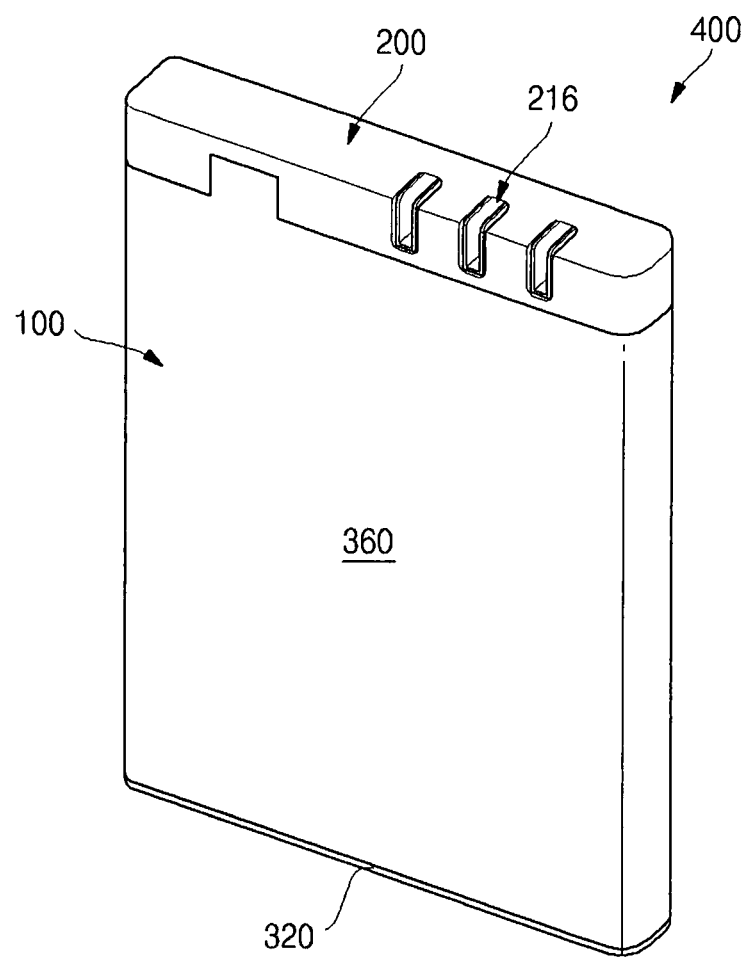
FIG. 1 is a perspective diagram illustrating a completed battery pack according to one exemplary embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
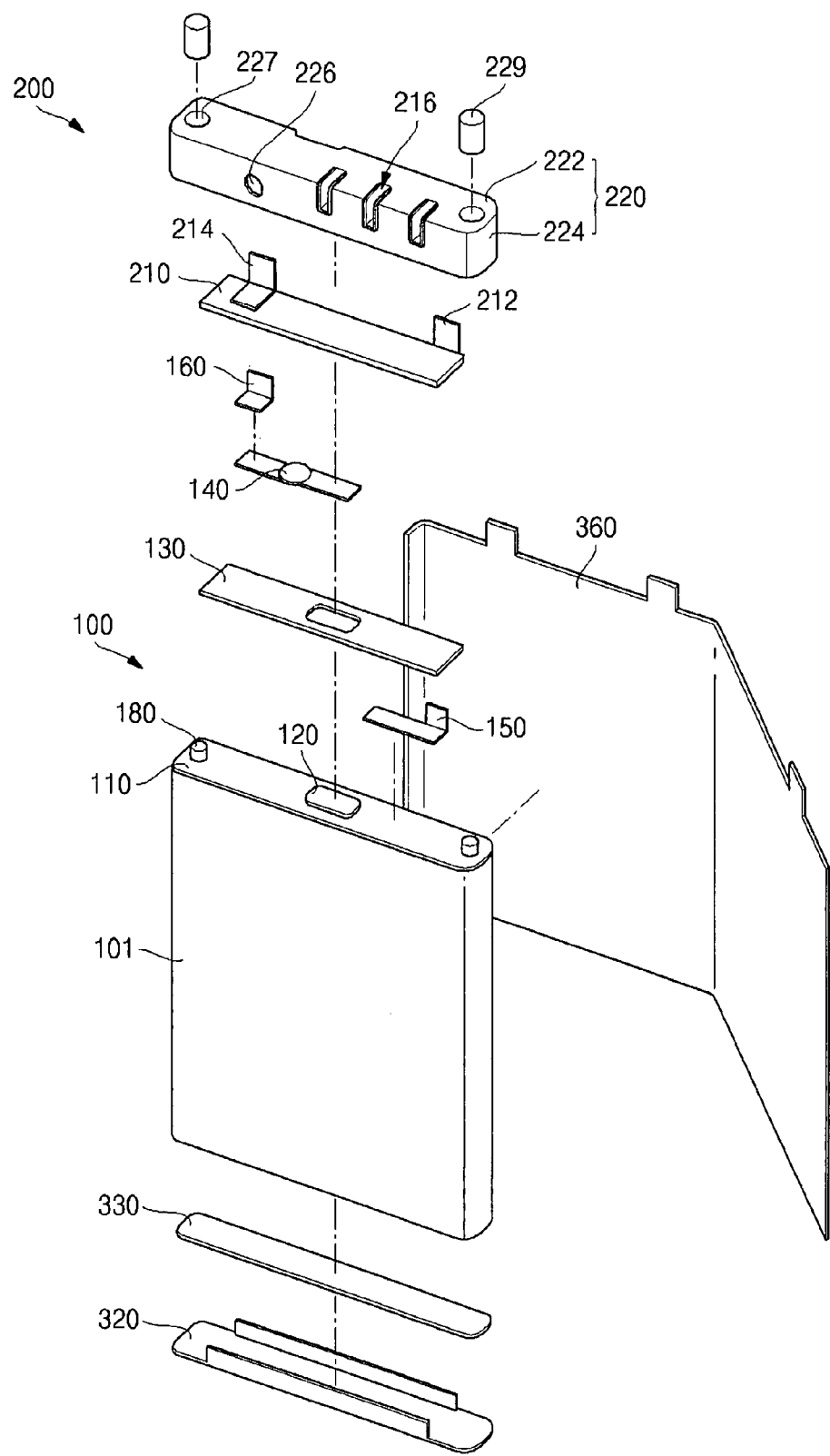
FIG. 2 is a perspective diagram illustrating that the battery pack of FIG. 1 is disassembled.
Figure 3:
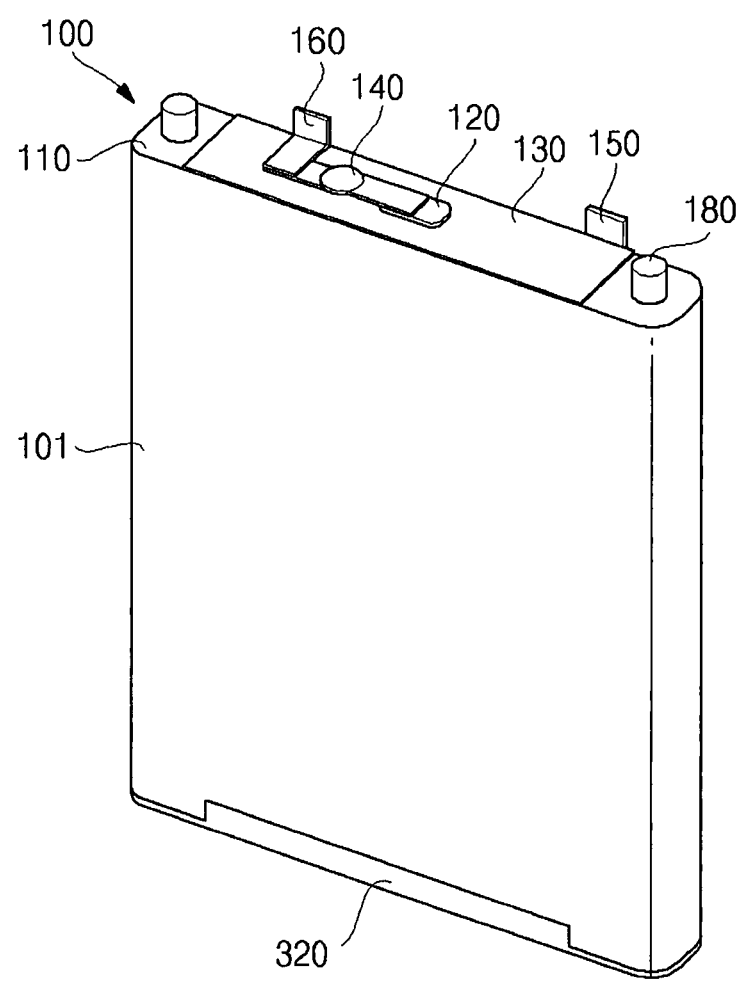
FIG. 3 is a perspective diagram illustrating a bare cell before a circuit accessory is coupled thereto in the battery pack of FIG. 2.
Figure 4:
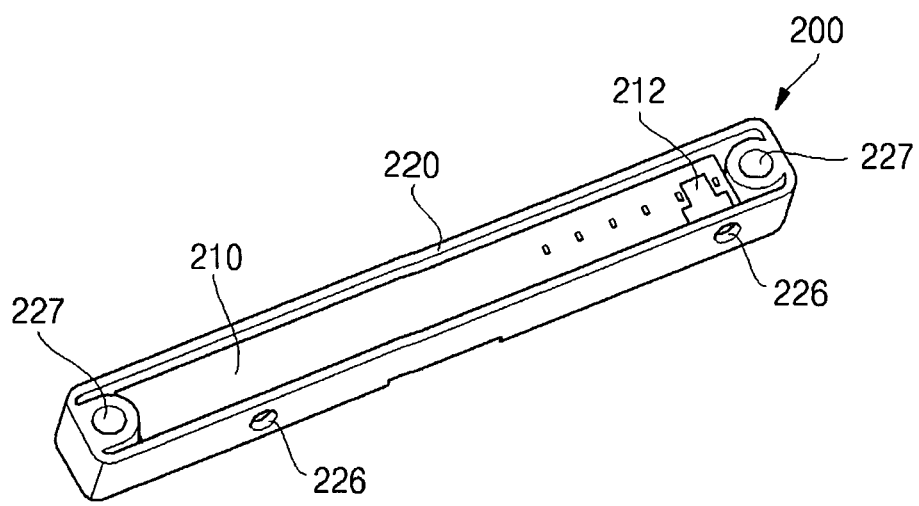
FIG. 4 is a perspective diagram illustrating a circuit accessory with the inside thereof facing upward in the battery pack of FIG. 2.
Figure 5:
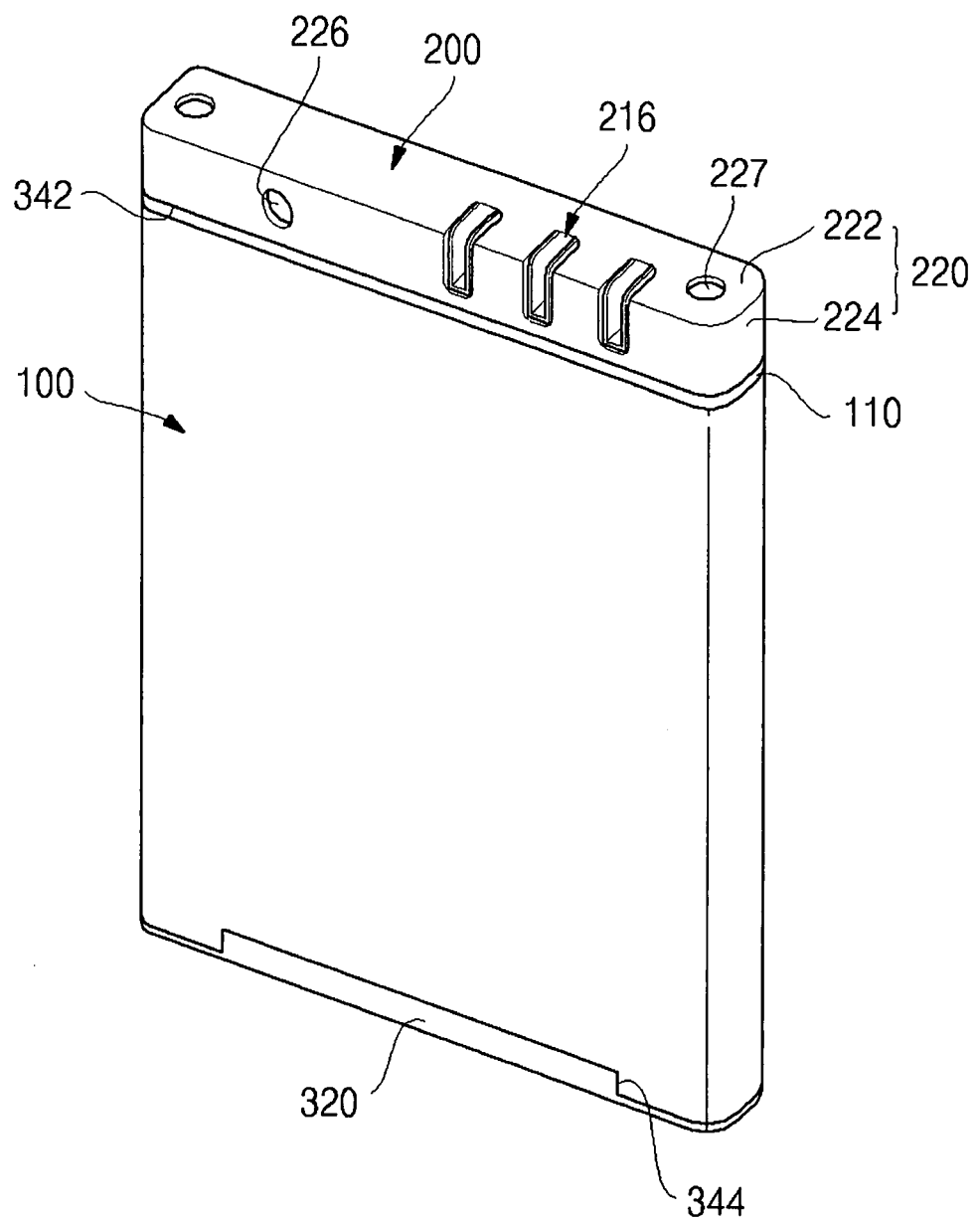
FIG. 5 is a perspective diagram illustrating that a bare cell and a circuit accessory are coupled by covering the bare cell of FIG. 3 with the circuit accessory of FIG. 4.

Turning now to the drawings, FIGS. 1 through 4 collectively, FIG. 1 is a perspective diagram illustrating a completed battery pack according to one exemplary embodiment of the present invention, FIG. 2 is a perspective diagram illustrating that the battery pack of FIG. 1 is disassembled, FIG. 3 is a perspective diagram illustrating a bare cell before a circuit accessory is coupled thereto in the battery pack of FIG. 2, FIG. 4 is a perspective diagram illustrating a circuit accessory with the inside thereof facing upward in the battery pack of FIG. 2, FIG. 5 is a perspective diagram illustrating that a bare cell and a circuit accessory are coupled by covering the bare cell of FIG. 3 with the circuit accessory of FIG. 4.

Referring to FIGS. 1 and 2, a battery pack 400 according to an embodiment of the present invention includes a bare cell 100 having a fixing member 180, a circuit accessory 200 coupled with bare cell 100, a lower cover 320 formed in the lower part of the bare cell 100 and a label 360.

Bare cell 100 includes an electrode assembly (not shown) having a positive electrode, a negative electrode and a separator interposed between the positive electrode and the negative electrode; a can 101 receiving the electrode assembly and an electrolyte (not shown); and a cap assembly including a cap plate 110 closing the opening portion of can 101.

Bare cell 100 includes a positive electrode terminal and a negative electrode terminal to supply charged power in the state of being electrically coupled with circuit accessory 200 through a positive electrode lead plate 150 and a negative electrode lead plate 160. In the present invention, the positive electrode terminal can be cap plate 110 itself or a metal plate (not shown) coupled on cap plate 110. A negative electrode terminal 120 is a terminal protruding perpendicularly from cap plate 110, and is electrically insulated from cap plate 110 by an insulator gasket (not shown) interposed therebetween. Naturally, the polarity of cap plate 110 playing the role of the positive electrode terminal and negative electrode terminal 120 can be different according to exemplary embodiments.

Positive electrode lead plate 150 and negative electrode lead plate 160 electrically coupling bare cell 100 with circuit accessory 200 have a shape of "L" approximately, and are made of a conductive material, for example, nickel or nickel alloy. Such a positive electrode lead plate 150, as illustrated in FIG. 3, is electrically coupled with the bare cell 100, with one side thereof being coupled with cap plate 110 by a method such as welding.

And, to prevent a short circuit due to unnecessary connection between bare cell 100 and a printed circuit board 210 of circuit accessory 200, an electrically insulating tape 130 is installed on the outer surface of the upper part of bare cell 100, i.e., on the outer surface of the cap plate 110. Electrically insulating tape 130 is made of an adhesive material in the same size as printed circuit board 210 of circuit accessory 200.

Negative electrode lead plate 160, as illustrated in FIG. 3, is electrically coupled with a current control unit such as a PTC (Positive Temperature Coefficient) device 140 whose one side is connected with negative electrode terminal 120, and is electrically coupled with bare cell 100. PTC device 140 prevents firing and explosion of the battery by short-circuiting an internal circuit thus prevents further current from flowing when the internal temperature of the battery rises, or the voltage of the battery rises due to over charge. Herein, PTC device 140 connected to one side of negative electrode lead plate 160 by a method such as welding is adhered and fixed to the upper part of cap plate 110 by electrically insulating tape 130 made of an adhesive material.

Battery pack 400 according to one exemplary embodiment of the present invention further includes fixing member 180 formed on the outer surface of cap plate 110 formed on the upper part of bare cell 100.

Fixing members 180 are installed in the shape of fixing members protruding on both side portions in the longitudinal direction of cap plate 110 fixing member 180 is separately installed on the outer surface of cap plate 110, or is formed in the structure of protruding to the outer surface by rolling cap plate 110. Herein, the fixing member 180 can be made of the same material as cap plate 110 made of aluminum or aluminum alloy. The fixing member 180 fixes circuit accessory 200 to bare cell 100 and supports circuit accessory 200 against external forces to prevent circuit accessory 200 from being separated from bare cell 100. Detailed explanation of the structure and the role of fixing member 180 will follow.

Referring to FIGS. 2 and 4, circuit accessory 200 is disposed on the upper part of the bare cell 100, i.e., on the upper part of cap plate 110, and includes a printed circuit board (PCB) 210, an upper cover 220 and an external terminal 216.

PCB 210 is a panel made of resin, on which a protection circuit (not shown) such as a circuit making the charging state uniform by controlling the charge and discharge of the battery, or a circuit preventing over discharge and over charge is formed. Although not shown in the drawing, circuit devices (not shown) are formed on PCB 210 to embody a charge-discharge circuit (not shown) and a protection circuit (not shown).

Electrical connection plates are installed on PBC 210 to electrically couple bare cell 100 and PCB 210 of the circuit accessory 200. The electrical connection plates include a positive electrode connection plate 212 and a negative electrode connection plate 214. Positive electrode connection plate 212 and negative electrode connection plate 214 installed in this manner are formed approximately in the shape of "L" for the electrical connection with the other side of positive electrode lead plate 150 and the other side of negative electrode lead plate 160, respectively. Generally, lead plates 150, 160 and electrical connection plates 212, 214 are coupled by spot welding, respectively.

Upper cover 220 includes a principal plane 222 having a shape and a size corresponding to those of cap plate 110, and a skirt 224 bent and extended from the edge of principal plane 222 to the direction of bare cell 100. Such an upper cover covers and protects PCB 210.

Upper cover 220 further includes a fixing member hole 227 on a position perpendicularly corresponding to fixing member 180 of bare cell 100. Bare cell 100 and circuit accessory 200 are coupled by inserting fixing member 180 in and coupled with the fixing member hole 227. The coupling of bare cell 100 and circuit accessory 200 will be explained in detail with reference to FIGS. 6 to 9b.

Also, upper cover 220 includes at least one weld hole 226 on skirt 224 corresponding to electrical connection plates 212, 214 coupled with lead plates 150, 160 of bare cell 100 for the electrical coupling of circuit accessory 200 including PCB 210 and bare cell 100. Herein, weld hole 226 may have any shape selected among a circle and a polygon.

Negative electrode lead plate 160 and negative electrode connection plate 214, and positive electrode lead plate 150 and positive electrode connection plate 212 can be coupled through weld hole 226 by resistance welding. Weld hole 226 is formed as one weld hole on skirt 224 corresponding negative electrode connection plate 214 in FIG. 2, and a weld hole is also formed on skirt 224 corresponding to negative electrode connection plate 214 in the opposite direction, and therefore serial type resistance welding can be used. And, a weld hole is formed on skirt 224 on one side corresponding to positive electrode connection plate 212 and positive electrode lead plate 150 as well, thus direct type resistance welding can be used. Herein, the reason that only one weld hole for the resistance welding of positive electrode lead plate 150 and positive electrode connection plate 212 respectively is that it is difficult to weld through two weld holes because external terminal 216 is disposed on the position on which positive electrode connection plate 212 is formed.

External terminal 216 is installed between PCB 210 and upper cover 220 and electrically couples PCB 210 with an external electronic device (not shown). Herein, external terminal 216 is formed to be connector type to let the electrical connection part (not shown) formed on the external electronic device (not shown) inserted therein, and can solve the problems of electrical connection (power off), and cracking and corrosion of a coating layer that occur in the existing pad type external terminal. External terminal 216 is installed on upper cover 220 that has been previously formed by injection molding, or on PCB 210.

And, after bare cell 100 and circuit accessory 200 are coupled together, a stopper 229 for sealing fixing member hole 227 is installed. Such a stopper forms a part of the exterior of battery pack 400. Herein, stopper 229 is made of any material selected among rubber, gluegun and silicon. Also, stopper 229 may be made of a polymer material having good adhesive property.

And, lower cover 320 is physically attached to the lower part of bare cell 100, and such coupling is made by a strip or length of tape 330 with opposite major surfaces both coated with layers of an adhesive. Such a lower cover 320 protects against external shock like damage caused when the battery is accidentally dropped. Lower cover 320 that is attached to tape 330 serves as an electrical insulator.

Label sheet 360 encloses the circumferential surface of bare cell 100 finally, in the state of that upper cover 220 and lower cover 320 illustrated in FIG. 5 are coupled with the upper part and lower part of bare cell 100, respectively. Label 360 reinforces the coupling force of upper cover 220 and lower cover 320, and reinforces the coupling force of the exteriors of upper cover 220, lower cover 320 and bare cell 100. Herein, label 360 is formed in the shape of covering the weld hole 226 of upper cover 220, contact portion 342 of upper cover 220 and bare cell 100 and a contact portion 344 of lower cover 320 and bare cell 100 illustrated in FIG. 5, and is adhered to the circumferential surface of bare cell 100.

Figure 6:
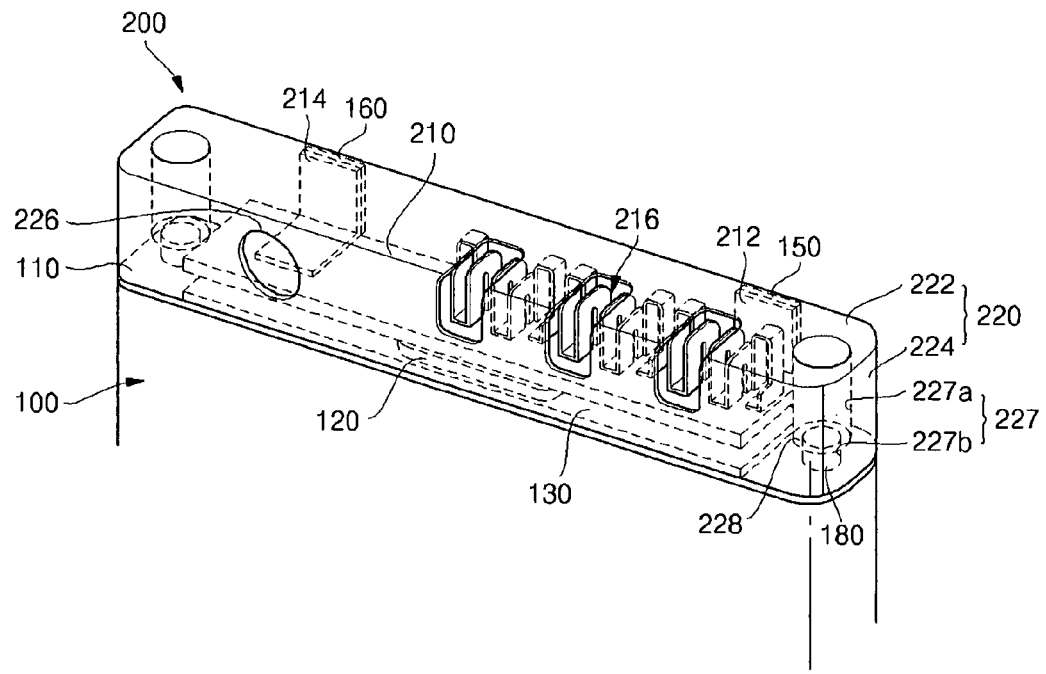
FIG. 6 is an internal perspective diagram illustrating the upper part of the battery pack illustrated in FIG. 5.
Figure 7:
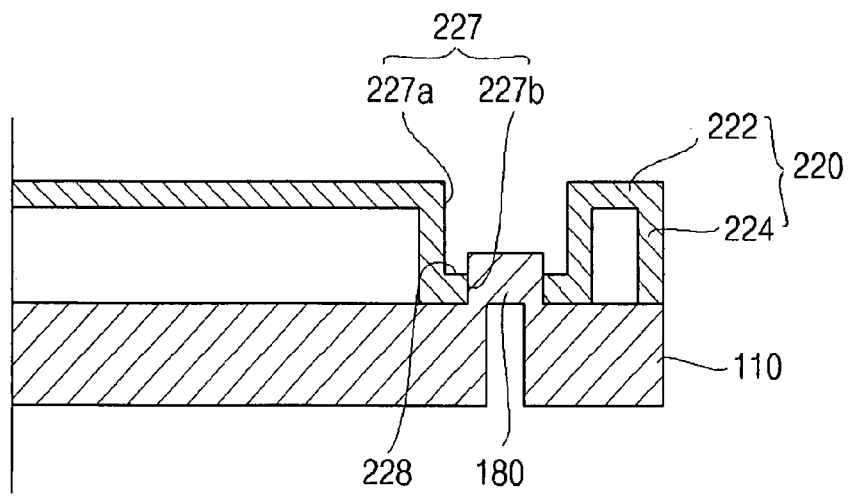
FIG. 7 is a cross-sectional diagram of the fixing member of FIG. 6.
Figure 8A:
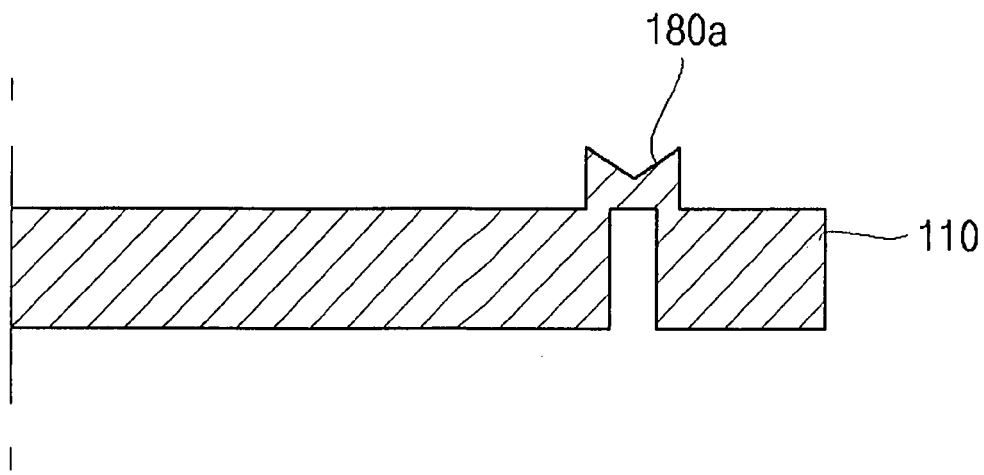
FIG. 8a is a cross-sectional diagram of another form of the fixing member illustrated in FIG. 7.
Figure 8B:
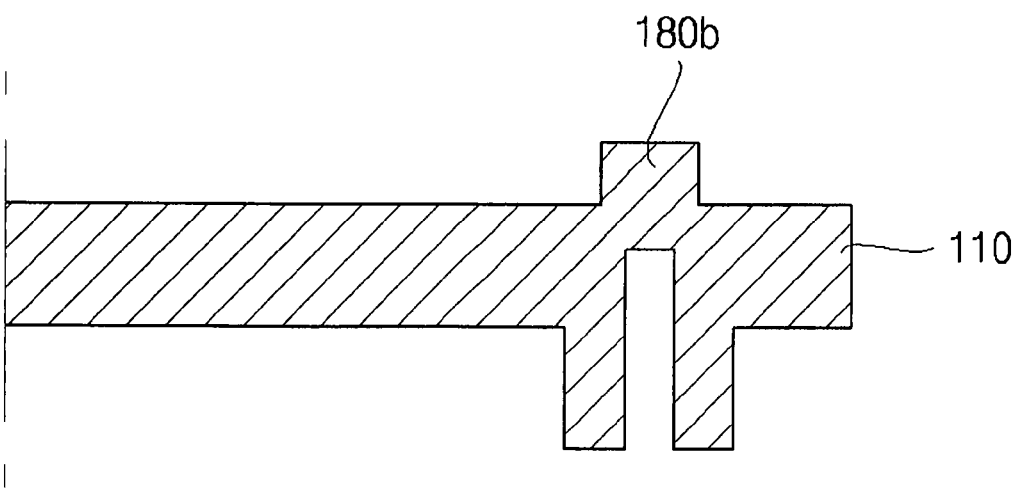
FIG. 8b is a cross-sectional diagram of another form of the cap plate illustrated in FIG. 7.
Figure 9A:
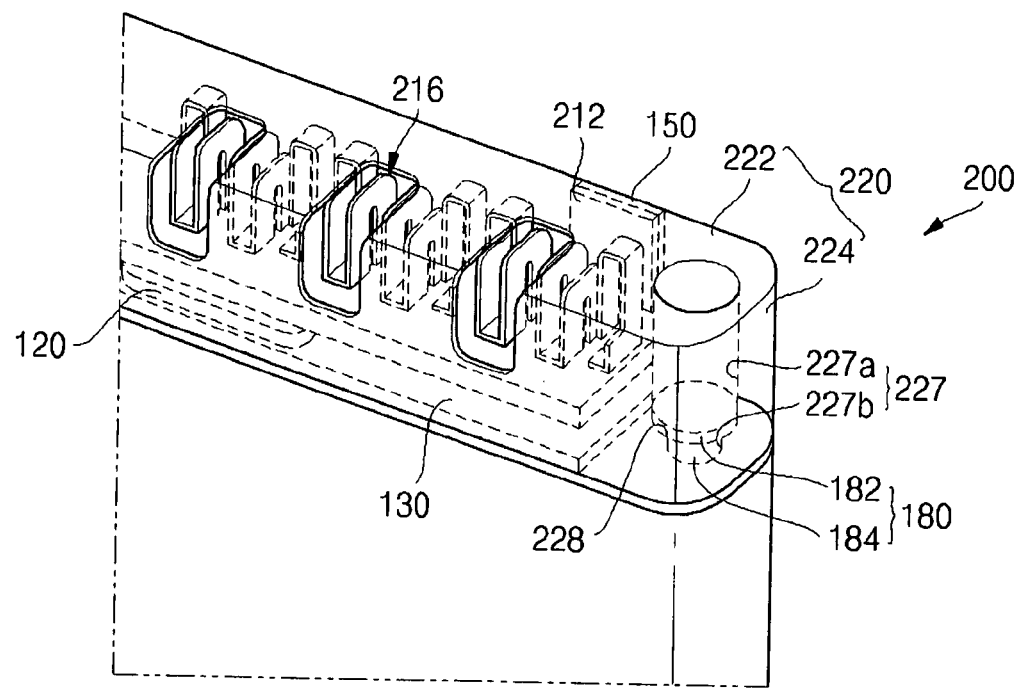
FIG. 9a is a perspective diagram illustrating that the fixing member of FIG. 6 is changed by a spinning or punching process.
Figure 9B:
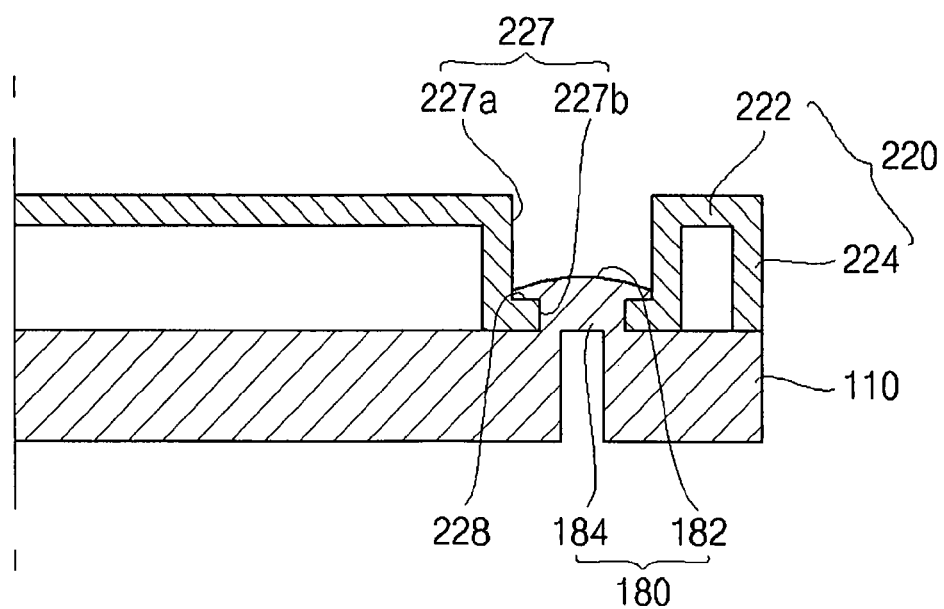

Turning now to the drawings, FIGS. 6 through 9b collectively, FIG. 6 is an internal perspective view illustrating the upper part of the battery pack illustrated in FIG. 5, FIG. 7 is a cross-sectional diagram of the fixing member of FIG. 6, FIG. 8a is a cross-sectional diagram of another form of the fixing member illustrated in FIG. 7, FIG. 8b is a cross-sectional diagram of another form of the cap plate illustrated in FIG. 7, FIG. 9a is a perspective diagram illustrating that the fixing member of FIG. 6 is changed by a spinning or punching process, FIG. 9b is a cross-sectional diagram illustrating the fixing member of FIG. 9a.

When looking into the coupling structure of bare cell 100 and circuit accessory 200 formed by coupling the PCB 210 and upper cover 220, firstly, as illustrated in FIG. 6, fixing member 180 formed in the shape of a protruding fixing member on cap plate 110 of bare cell 100 is inserted in fixing member hole 227 of upper cover 220.

Fixing member hole 227 is formed in a direction from the outer surface of principal plane 222 to the inside of upper cover 220 on a position perpendicularly corresponding to fixing member 180 formed on cap plate 110 of bare cell 100, and includes an upper hole 227a and a lower hole 227b.

Diameter of upper hole 227a is formed to be greater than the diameter of lower hole 227b to form a peripheral flange around stepped surface 228 between upper hole 227a and lower hole 227b. Also, the height of lower hole 227b is shorter than the protruding height of fixing member 180 to make fixing member 180 in the shape of a protruding fixing member above stepped surface 228 when fixing member 180 is inserted in fixing member hole 227. In other word, fixing member 180 inserted in lower hole 227b of fixing member hole 227 protrudes above stepped surface 228.

Fixing members 180 are formed to protrude on both side portions in the longitudinal direction of cap plate 110, and is formed to have a diameter smaller than or identical to that of lower hole 227b thus are easily inserted in lower hole 227b of fixing member hole 227 of the upper cover 220. Herein, fixing member 180 in the shape of a fixing member is separately installed on cap plate 110, or is formed by rolling cap plate 110. The rolling process means making the cap plate be lengthen.

As illustrated in FIG. 7, when the fixing member is formed by rolling a cap plate 110 having a uniform thickness, the protruding height of fixing member 180 from the outer surface of cap plate 110 is formed to be ½ to ⅔ of the thickness of cap plate 110 which is, for example, 0.4 to 0.8 mm. If the protruding height of fixing member 180 is less than ½ of the thickness of cap plate 110, then the protruding height of fixing member 180 is too short and thus fixing member 180 may not protrude sufficiently above stepped surface 228 separated from the outer surface of cap plate 100 when bare cell 100 is covered with upper cover 220. Thus it may be difficult to perform a spinning or punching process to make fixing member 180 laid across stepped surface 228 of fixing member hole 227 to fix upper cover 220 to bare cell 100. And, if the protruding height of fixing member 180 exceeds ⅔ of the thickness of cap plate 110, then the thickness of cap plate 110 on which fixing member 180 is formed becomes too thin and cap plate 110 gets weak in terms of the strength. The spinning process means quickly turning things, and the punching process means hitting things hardly.

Fixing member 180 may be formed in a different shape, as illustrated in FIG. 8a. Referring to FIG. 8a, fixing member 180a formed in a shape different from fixing member 180 of FIG. 7 is formed to have a concave recess in the upper surface. This makes the upper part of fixing member 180a easily spread on and be laid across stepped surface 228 of fixing member hole 227 when a spinning or punching process is performed on fixing member 180a in the shape of a fixing member to fix circuit accessory 200 to bare cell 100 after fixing member 180a having a concave recess is inserted in lower hole 227b of fixing member hole 227 of upper cover 220. That is, fixing member 180a having a concave recess in the upper part has smaller internal density in the upper part than fixing member 180 that has no concave recess in the upper part, and thus the force pushing the upper part of fixing member 180a is well transmitted to the edge portion of the concave recess during the spinning or punching process. Accordingly, the upper part of fixing member 180a can be spread and be laid across stepped surface 228 of fixing member hole 227 better than the upper part of fixing member 180 illustrated in FIG. 7. Herein, the perpendicular section of the concave recess is a polygon, for example, an inverted triangle. However, the shape of polygon is not limited to an inverted triangle. And, the concave recess has only to be formed on the central part of the upper surface of fixing member 180.

Also, a fixing member 180b illustrated in FIG. 8b can be formed to protrude from the outer surface of a cap plate 110 by rolling cap plate 110 whose thickness is not uniform as a whole, differently from the cap plate illustrated in FIG. 7. That is, in cap plate 110, the thickness of the area on which fixing member 180b is formed is made to be thicker than that of the other area. This is because the part of the cap plate having a thin thickness can be transformed by the force generated by the rolling process at the time of the rolling process for making the fixing member protruded from the outer surface of the cap plate.

Herein, the thickness of the area of the cap plate 110 on which the fixing member 180b is formed is formed to be between twice and three times of the thickness of the other area of the cap plate 110. If the thickness of the area of the cap plate 110 on which fixing member 180b is formed is less than twice of the thickness of the other area of cap plate 110, it is not sufficient to prevent the deformation of cap plate 110 at the time of the rolling of cap plate 110. And, if the thickness of the area of cap plate 110 on which fixing member 180b is formed is more than three times of the thickness of the other area of cap plate 110, the thickness of cap plate 110 becomes too thick and it is not easy to perform the rolling process of cap plate 110 to form fixing member 180b.

In FIG. 8b, a concave recess (not shown) whose perpendicular section is an inverted triangle may be formed on the upper surface of fixing member 180b like fixing member 180a illustrated on FIG. 8a.

Then, fixing member 180 in the shape of a fixing member protruding above stepped surface 228 after passing through lower hole 227b of fixing member hole 227 illustrated in FIG. 6 is changed to have a T-shaped perpendicular section, i.e., to have the shape of having a head portion 182 and a post portion 184 by the spinning or punching process as illustrated in FIGS. 9a and 9b.

Head portion 182 of fixing member 180 is laid across stepped surface 228 on the inner surface of fixing member hole 227 and post portion 184 is disposed in lower hole 227b and thereby fixing member 180 holds upper cover 220 including fixing member hole 227. Herein, the diameter of head portion 182 is greater than the diameter of lower hole 227b, and is less than or equal to the diameter of upper hole 227a to be laid across stepped surface 228 on the inner surface of fixing member hole 227.

Such "T" shaped fixing members 180 are formed on both side portions of the upper part of bare cell 100, and couple circuit accessory 200 including upper cover 220 with bare cell 100, and play the role of a support to prevent circuit accessory 200 from being separated from bare cell 100 by the external force. In one exemplary embodiment of the present invention, upper cover 220 may be firstly coupled with PCB 210 through the injection molding, and then PCB 210 is electrically connected with bare cell 100; PCB 210 may be firstly electrically connected with bare cell 100, then upper cover 220 is formed by injection molding.

Figure 10:
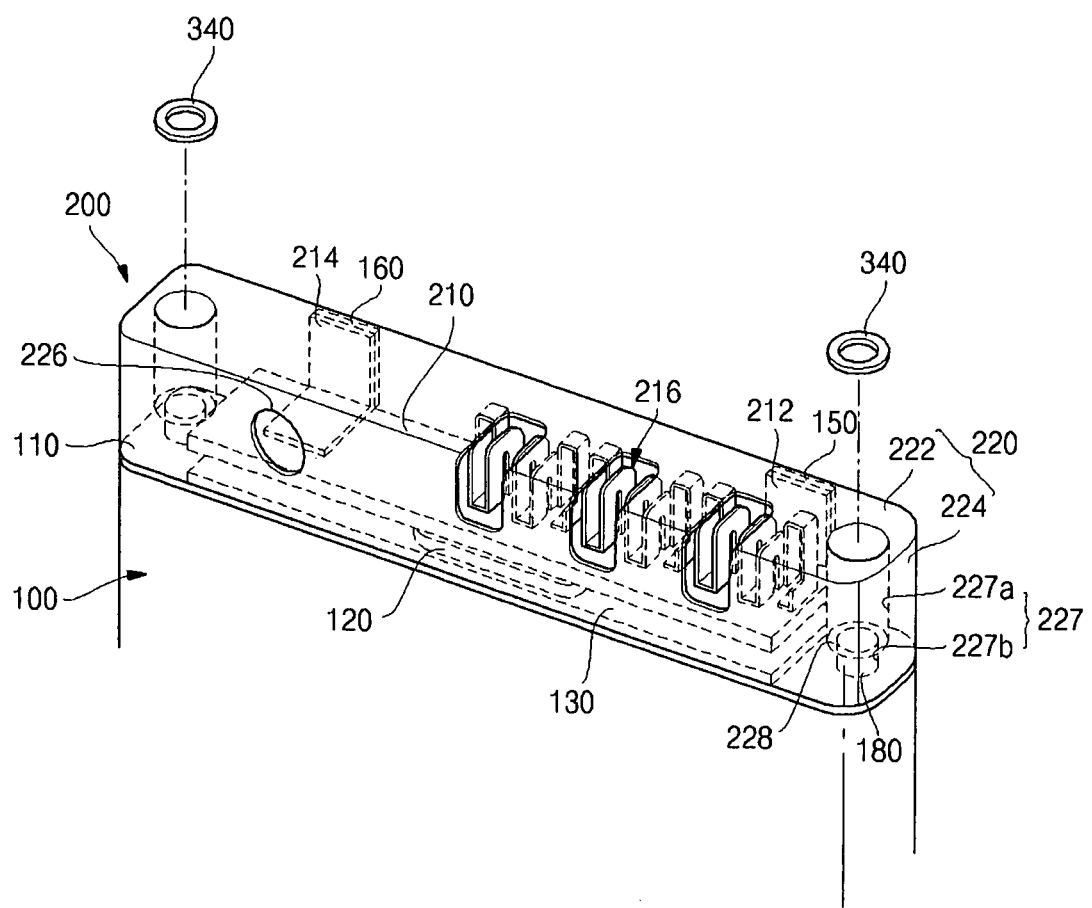
FIG. 10 is a partial perspective diagram illustrating a fixing member inserted in a fixing member hole of an upper cover in a battery pack according to another exemplary embodiment of the present invention.
Figure 11A:
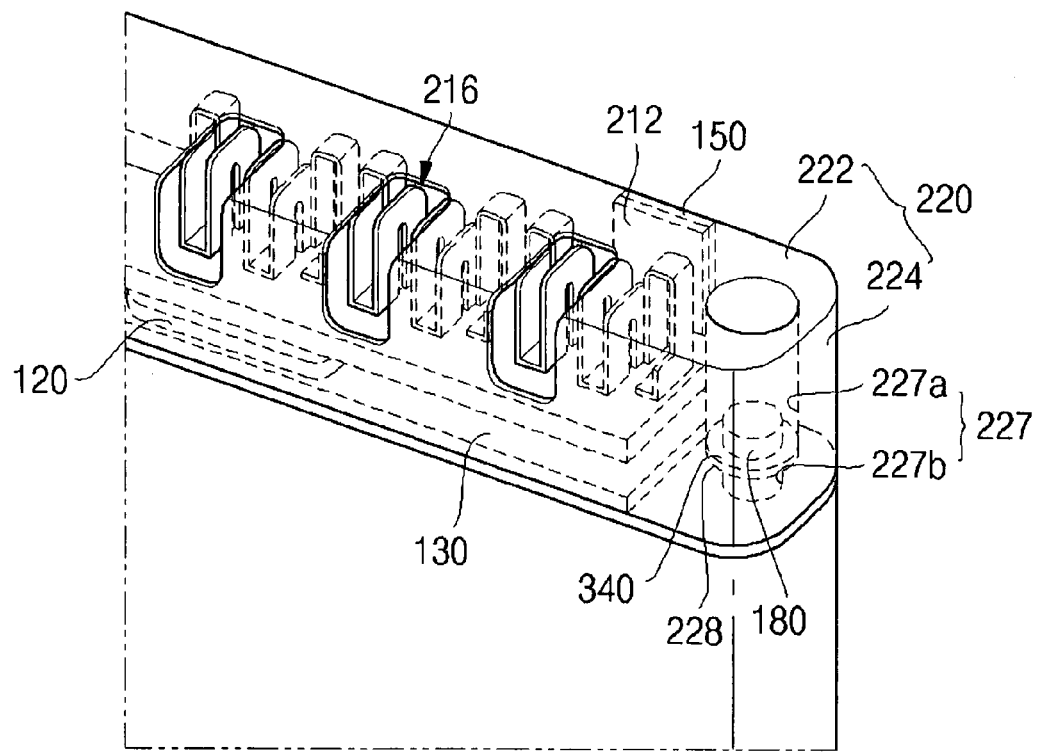
FIG. 11a is a partial perspective diagram illustrating a washer inserted on the fixing member of FIG. 10.
Figure 11B:
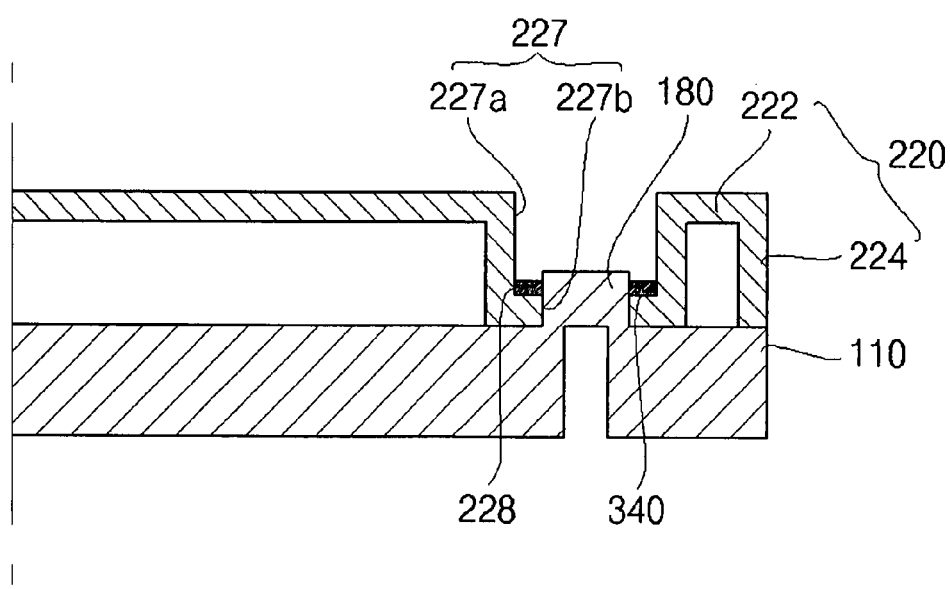
Figure 12A:
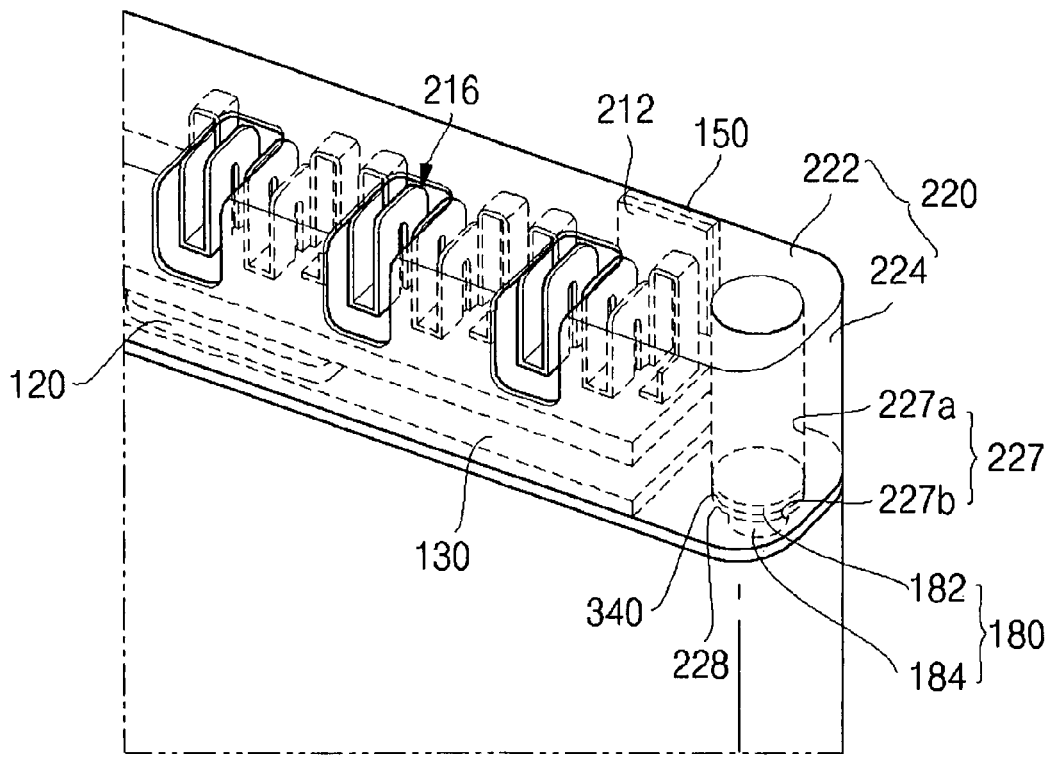
FIG. 12a is a perspective diagram illustrating the fixing member of FIG. 11a changed by a spinning or punching process.
Figure 12B:
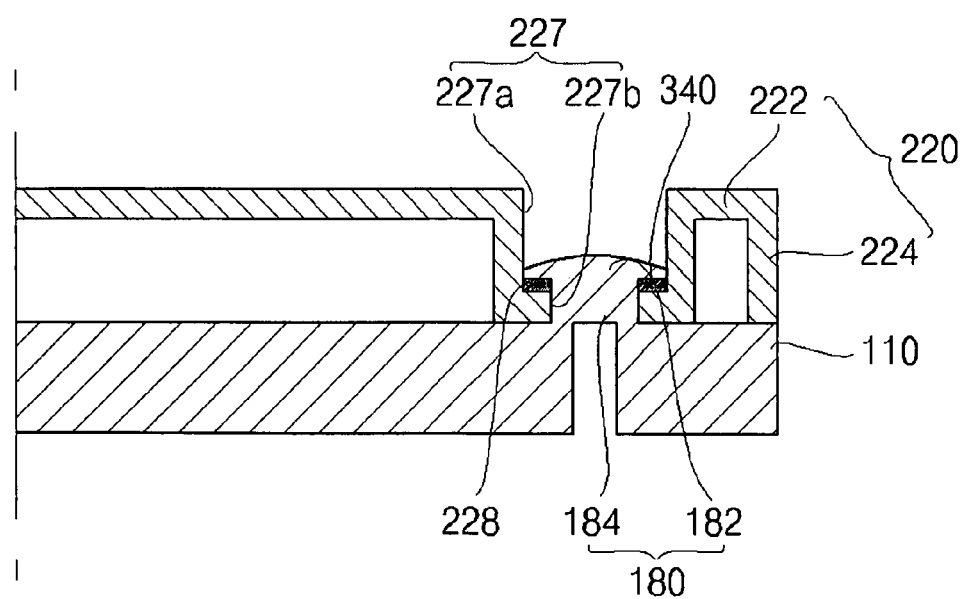

Turning now to the drawings, FIGS. 10 through 12b collectively, FIG. 10 is a partial perspective diagram illustrating a fixing member inserted in a fixing member hole of an upper cover in a battery pack according to another exemplary embodiment of the present invention, FIG. 11a is a partial perspective diagram illustrating a washer inserted on the fixing member of FIG. 10, FIG. 11b is a cross-sectional diagram illustrating the fixing member of FIG. 11a, FIG. 12a is a perspective diagram illustrating the fixing member of FIG. 11a changed by a spinning or punching process, FIG. 12b is a cross-sectional diagram illustrating the fixing member of FIG. 12a.

When compared with the battery pack according to one embodiment of the present invention, the battery pack according to another exemplary embodiment of the present invention has the same constitutional elements except that an additional washer is installed on a fixing member inserted in a fixing member hole of an upper cover. Therefore, the same drawing reference numerals will be used for the same elements, and explanation on the same elements will be omitted. Therefore, in the battery pack according to another embodiment of the present invention, explanation will be focused on the washer.

Referring to FIGS. 10 to 11b, the battery pack according to another embodiment of the present invention further includes a washer 340 inserted on a fixing member 180 in the shape of a fixing member inserted in a fixing member hole 227 of an upper cover 220.

As illustrated in FIG. 10, the outer diameter of washer 340 is less than or equal to the diameter of upper hole 227a of fixing member hole 227 and the inner diameter of washer 340 is greater than or equal to the diameter of the lower hole 227b. This is to insert washer 340 on fixing member 180 in the shape of a fixing member protruding above stepped surface 228 after passing lower hole 227b of fixing member hole 227, as illustrated in FIGS. 11a and 11b.

Fixing member 180 in the shape of a fixing member on which washer 340 is inserted is changed to have a "T" shaped perpendicular section, i.e., to have the shape of having a head portion 182 and a post portion 184 by a spinning process or a punching process as illustrated in FIGS. 12a and 12b. Head portion 182 of fixing member 180 is disposed in the structure of being laid across washer 340 and post portion 184 is disposed in lower hole 227b, and thus fixing member 180 holds upper cover 220 including fixing member hole 227. Here, the diameter of head portion 182 is greater than the diameter of lower hole 227b and less than or equal to the diameter of upper hole 227a to be laid across a stepped surface 228 on the inner surface of fixing member hole 227.

Washer 340 is made of a stainless steel. Accordingly, washer 340 having strength and is disposed on the coupling portion of the T-shaped fixing member 180 and the stepped surface 228 of fixing member hole 227, and thereby makes the coupling strength stronger than in a case where the T shaped fixing member 180 is coupled on stepped surface 228 of fixing member hole 227 without a separate support member.

Figure 13:
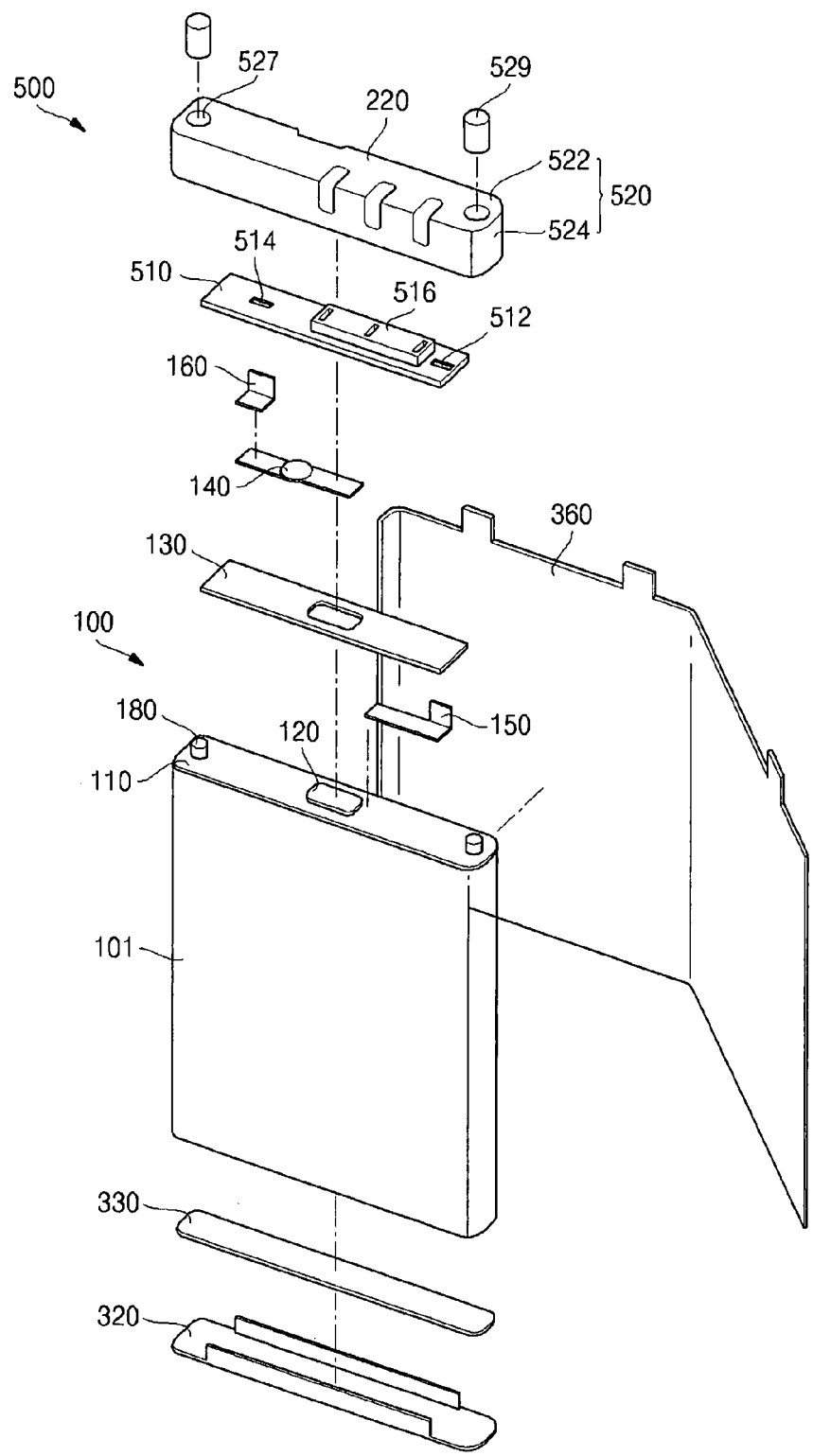
FIG. 13 is a perspective diagram illustrating a separated battery pack still according to another exemplary embodiment of the present invention.

FIG. 13 is a perspective diagram illustrating a separated battery pack according to still another exemplary embodiment of the present invention. When compared with the battery pack according to one embodiment of the present invention, the battery pack according to another exemplary embodiment of the present invention has the same constitutional elements except for the structure of the PCB of the circuit accessory. Therefore, the same drawing reference numerals will be used for the same elements, and explanation on the same elements will be omitted. Therefore, in the battery pack according to another embodiment of the present invention, explanation will be focused on the structure of the PCB electrically coupled with the bare cell.

The battery pack is formed by electrically coupling a PCB 510 of a circuit accessory 500 with a bare cell 100 firstly and make an upper cover 520 cover PCB 510 to be coupled with the bare cell 100.

A circuit accessory 500 includes PCB 510, an external terminal 516 and upper cover 520.

PCB 510 includes sockets 512, 514 instead of the electrical connection plates installed in the PCB 210 illustrated in FIG. 2. And, an external terminal 516 is installed on PCB 510. The socket electrically couples PCB and the bare cell 100. Specifically, an positive electrode lead plate 150 installed on bare cell 100 is electrically coupled by being inserted in the socket 512, and a negative electrode lead plate 160 is electrically coupled by being inserted in the socket 514. Sockets 512, 514 may be formed in the shape of a hole or a groove to let lead plates 150, 160 inserted therein. Herein, sockets 512, 514 are installed in a portion of PCB 510 excluding the area where external terminal 516 is installed.

As shown above, the battery pack according to still another exemplary embodiment of the present invention electrically can couple bare cell 100 and PCB 510 more easily by inserting lead plates 150,160 in sockets 512,514, than the battery pack according to one embodiment of the present invention which welds lead plates 150,160 to separate electrical connection plates 212,214, thus can reduce the manufacturing cost for separate electrical connection plates 212,214.

External terminal 516 can be installed on PCB 510 or on upper cover 520 including a principal plane 522 and a skirt 524, as explained above, but is installed on PCB 510 in another embodiment of the present invention.

As shown above, fixing member 180 of bare cell 100 electrically coupled with PCB 510 is inserted in fixing member hole 527 of upper cover 520. And fixing member 180 inserted in fixing member hole 527 is laid across the stepped surface (not shown) formed on the inner surface of fixing member hole 527 by a spinning or punching process. Accordingly, upper cover 520 and bare cell 100 are coupled. Then, fixing member hole 527 of upper cover 520 is sealed with a stopper 529.

Figure 14:
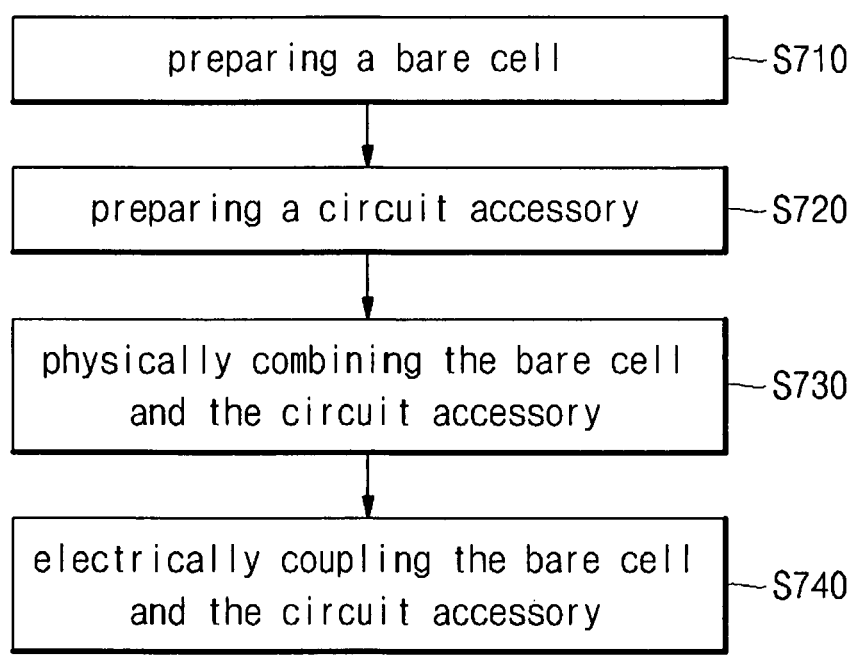
FIG. 14 is a flow diagram illustrating a fabricating method of a battery pack according to the present invention.

FIG. 14 is a flow diagram illustrating a fabricating method of a battery pack according to the present invention.

Referring to FIG. 14, the fabrication method of a battery pack according to an exemplary embodiment of the present invention is as follows.

The battery pack according to the exemplary embodiment of the present invention includes a step of preparing a bare cell having a fixing member installed on the upper part thereof (S710), a step of preparing a circuit accessory having a fixing member hole formed thereon (S720), a step of assembling by physically combing the circuit accessory and the bare cell (S730) and a step of electrically coupling the bare cell and the circuit accessory (S740).

Referring to FIGS. 2 and 3, in the step of preparing a bare cell having a fixing member installed on the upper part thereof (S710), an electrode assembly (not illustrated) and an electrolyte (not shown) are received in the opening portion of a can 101, and a fixing member 180 is installed on the upper part of the bare cell 100 formed by closing the opening portion of the can 101 with a cap plate 110 of the cap assembly.

Fixing members 180 are formed in the shape of protruding fixing members from the outer surface of both side portions in the longitudinal direction of cap plate 110. Fixing members 180 are formed by rolling cap plate 110 or are separately installed on cap plate 110. The protruding height of fixing member 180 protruded from outer surface of cap plate 110 by a rolling process is formed to be ½ to ⅔ of the thickness of cap plate 110.

And, lead plates 150,160 are installed on cap plate 110 of bare cell 100 on which fixing members 180 are installed.

Referring to FIGS. 2 and 4, in the step of preparing a circuit accessory on which a fixing member hole is formed (S720), a PCB 210 including electrical connection plates 212, 214 to be coupled with lead plates 150, 160 installed on the bare cell is prepared. And, an upper cover 220 covering PCB 210 and including fixing member holes 227 is prepared. And, an external terminal 216 is installed on PCB 210 or upper cover 220 for the electrical connection with PCB 210. Herein, external terminal 216 is installed on upper cover 220 to electrically couple with PCB 210. Such an external terminal part 216 is formed to be connector type.

Upper cover 220 is prepared by extruding a principal plane 222 having a shape and a size corresponding to those of cap plate 110 and a skirt 224 bent and extended from the edge of principal plane 222 to the direction of bare cell 100; disposing a fixing member hole 227 on principal plane 222 corresponding to fixing member 180; and forming at least one weld hole 226 on skirt 224 corresponding to electrical connection plates 212, 214 of PCB 210 all together.

Fixing member hole 227 of upper cover 220 includes an upper hole 227a and a lower hole 227b formed in a direction from the outer surface of principal plane 222 to the inside of upper cover 220, and the diameter of upper hole 227a is formed to be greater than the diameter of lower hole 227b to form a stepped surface 228 between upper hole 227a and lower hole 227b. And, the height of lower hole 227b is formed to be smaller than the protruding height of fixing member 180 to make the fixing member in the shape of a protruding fixing member above stepped surface 228 when fixing member 180 is inserted in fixing member hole 227.

Referring to FIGS. 6 to 9b, in the step of physically coupling a circuit accessory and a bare cell (S730), fixing member 180 in the shape of a fixing member installed in the upper part of bare cell 100 is inserted to pass through lower hole 227b of fixing member hole 227 of upper cover 220 and protrude above stepped surface 228. And fixing member 180 is changed to have a head portion laid across stepped surface 228 and a post portion 184 disposed in lower hole 227b by a spinning or punching process. In another embodiment of this invention, referring to FIGS. 10 to 12b, before fixing member 180 is transformed by spinning or punching, a washer 340 is inserted on fixing member 180, and then the fixing member is transformed to be a head portion 182 laid across washer 340 and a post portion 184 disposed in lower hole 227b by the spinning or punching process. Likewise, bare cell 100 and circuit accessory 200 can be fixed and coupled by letting fixing member 180 of bare cell 100 be laid across stepped surface 228 of circuit accessory 200 or washer 340.

And, referring to FIGS. 2 and 5, in the step of electrically coupling a bare cell and a circuit accessory (S740), bare cell 100 and circuit accessory 200 are electrically coupled by welding lead plates 150,160 of the bare cell 100 and electrical connection plates 212,214 of PCB 210 included in circuit accessory 200 through weld hole 226 of upper cover 220.

And, the battery pack is completed by covering and sealing fixing member hole 227 of upper cover 220 with a stopper, and adhering a label 360 to the side portion of the bare cell 100, including weld hole 226 of upper cover 220 and contact portion 342 of upper cover 220 and bare cell 110.

In another embodiment of this invention, referring to FIG. 12, in the step of preparing a circuit accessory (S720), electrical connection plates 212, 214 coupled with lead plates 150, 160 are removed and sockets 512, 514 are formed on PCB 510. Bare cell 100 and PCB 510 can be electrically coupled by simply inserting lead plates 150, 160 of bare cell 100 in sockets 512, 514 of PCB 510 included in circuit accessory 500 respectively.

External terminal 216 is electrically connected with cap plate 110 through positive electrode connection plate 212 and positive electrode lead plate 150. Also, external terminal 216 is electrically connected with negative electrode terminal 120 through negative electrode connection plate 214, negative electrode lead plate 160 and current control unit 140. Here, the parts electrically connected with cap plate 110 and negative electrode terminal 120 in external terminal 216 are insulated from each other.

As described above, the battery pack and the fabricating method thereof according to the exemplary embodiment of the present invention firmly fixes and couples a circuit accessory on a bare cell and makes the circuit accessory be supported by the bare cell simultaneously and prevents the circuit accessory from being separated from the bare cell by external force like bending, twisting and falling of the battery, by forming a fixing member protruding on the upper part of the bare cell, and coupling the fixing member with a fixing member hole formed on an upper cover previously formed by injection molding in the type of the fixing member being laid across the fixing member hole.

Accordingly, the battery pack and the fabricating method thereof according to the exemplary embodiment of the present invention prevents electronic components from being damaged by resin of high temperature and high pressure when a bare cell and a protection circuit board are coupled by molding resin in a conventional battery pack, and does not need to separately install a holder in order to assure that a resin molding portion formed by resin molding as an external case will be supported by the bare cell. Therefore, increase of the entire fabricating cost due to a separate holder can be prevented.

Also, the battery pack and the fabricating method thereof according to the exemplary embodiment of the present invention prevents power off of electric flow and cracking and corrosion of an external terminal that occur when a conventional battery pack having a flat pad type external terminal is coupled with an external electronic device, by forming a connector-type external terminal for coupling electrically a bare cell, and coupling an upper cover previously formed by injection molding with the bare cell.

The present invention is not limited to a certain desirable embodiment as described above. It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A battery pack, comprising:
a bare cell including a cap plate on the upper part of the bare cell, the cap plate comprising a fixing member which protrudes from an outer surface of the cap plate, the fixing member being integrally formed with the cap plate as a single body;
a circuit accessory coupled with the upper part of the bare cell, the circuit accessory comprising a continuous upper cover, the continuous upper cover comprising a fixing member hole which corresponds to the fixing member, and the fixing member being inserted in and coupled with the fixing member hole; and
the fixing member hole comprising two contiguous holes disposed within the continuous upper cover, the two contiguous holes having different diameters, the two contiguous holes forming a stepped surface, the fixing member passing through one of the two contiguous holes, and a head portion of the fixing member laid across the stepped surface disposed between the two contiguous holes.

2. The battery pack of claim 1, wherein the fixing member is laid across and is coupled with the inner surface of the fixing member hole, and
wherein the shape of a cross section of the fixing member after being coupled with the inner surface of the fixing member hole has a "T" shape.

3. The battery pack of claim 1, wherein the circuit accessory is disposed on an upper part of the cap plate and is electrically coupled with the bare cell through a lead plate installed on the cap plate, and wherein the circuit accessory comprises:
a printed circuit board electrically coupled with the bare cell by the lead plate;
the upper cover covering the printed circuit board, including the fixing member hole to couple the circuit accessory with the bare cell with a deformation of the fixing member; and
an external terminal installed between the printed circuit board and the cover, and electrically coupling the printed circuit board and an external electronic device.

4. The battery pack of claim 3, wherein the external terminal is an electrical connector.

5. The battery pack of claim 3, wherein the upper cover comprises a principal plane having a shape and a size corresponding to the cap plate and a skirt bent and extended from edges of the principal plane to the periphery of the bare cell,
wherein the fixing member hole includes an upper hole and a lower hole formed in a direction from the outer surface of the principal plane to the inside of the upper cover on a position perpendicularly conforming to the fixing member, and the diameter of the upper hole is greater than the diameter of the lower hole to form a peripheral flange around the stepped surface between the upper hole and the lower hole, and
wherein the fixing member includes the head portion laid across the peripheral flange and a post portion disposed in the lower hole.

6. The battery pack of claim 5, further comprising a washer installed around the core and between the stepped surface and the head portion of the fixing member, and
wherein the outer diameter of the washer is less than or equal to the diameter of the upper hole of the fixing member hole, and the inner diameter of the washer is greater than or equal to the diameter of the lower hole.

7. The battery pack of claim 6, wherein the washer is made of a stainless steel.

8. The battery pack of claim 5, wherein the diameter of the head portion is greater than the diameter of the lower hole and is less than or equal to the diameter of the upper hole.

9. The battery pack of claim 5, wherein a concave recess having a cross-section has a polygonal shape is formed on the upper surface of the head portion.

10. The battery pack of claim 1, wherein the cap plate has a thickness between twice and three times of that of the rest area in an area adjoining the area on which the fixing member is formed.

11. The battery pack of claim 5, wherein at least one weld hole is formed on the skirt of the upper cover corresponding to electrical connection plates of the printed circuit board to weld the electrical connection plates formed on the printed circuit board to the lead plates of the bare cell, and
further comprising a label adhered to the weld hole of the upper cover and adhered to enclose a side portion of the bare cell including the contact portion of the bare cell and the upper cover.

12. The battery pack of claim 3, wherein the lead plate of the bare cell is inserted in a socket formed in the printed circuit board.

13. The battery pack of claim 1, wherein a stopper made of a material selected among rubber, glue and silicon is installed to seal the fixing member hole.

* * * * *